(12) United States Patent
Bode et al.

(10) Patent No.: US 10,316,274 B2
(45) Date of Patent: Jun. 11, 2019

(54) POLYMER ACTIVE INGREDIENTS WHICH IMPROVE PRIMARY DETERGENT POWER

(71) Applicants: Henkel AG & Co. KGaA, Duesseldorf (DE); Fraunhofer Gesellschaft zur Foerderung der angewandten Forschung e.V., Munich (DE)

(72) Inventors: Nicole Bode, Duesseldorf (DE); Benoit Luneau, Ratingen (DE); Inga Kerstin Vockenroth, Duesseldorf (DE); Andre Laschewsky, Potsdam (DE); Erik Wischerhoff, Potsdam (DE); Michael Pach, Potsdam (DE)

(73) Assignees: Henkel AG & Co. KGaA (DE); Fraunhofer Gesellschaft zur Foerderung der angewandten Forschung e.V. (DE)

( * ) Notice: Subject to any disclaimer, the term of this patent is extended or adjusted under 35 U.S.C. 154(b) by 0 days.

(21) Appl. No.: 14/737,021

(22) Filed: Jun. 11, 2015

(65) Prior Publication Data

US 2015/0275146 A1 Oct. 1, 2015

Related U.S. Application Data

(63) Continuation of application No. PCT/EP2013/076018, filed on Dec. 10, 2013.

(30) Foreign Application Priority Data

Dec. 14, 2012 (DE) .................. 10 2012 024 442

(51) Int. Cl.
| | |
|---|---|
| C11D 1/02 | (2006.01) |
| C11D 3/28 | (2006.01) |
| C11D 3/37 | (2006.01) |
| C08F 226/10 | (2006.01) |

(52) U.S. Cl.
CPC .......... *C11D 3/3776* (2013.01); *C08F 226/10* (2013.01); *C11D 3/28* (2013.01); *C11D 3/3769* (2013.01)

(58) Field of Classification Search
CPC ....... C11D 3/28; C11D 3/3769; C11D 3/3776; B08B 3/04
USPC ............... 510/476, 500, 501; 134/39, 40, 42
See application file for complete search history.

(56) References Cited

U.S. PATENT DOCUMENTS

| | | | | |
|---|---|---|---|---|
| 4,579,681 A * | 4/1986 | Ruppert | ............... | C11D 3/0036 510/299 |
| 4,664,839 A | 5/1987 | Rieck | | |
| 4,820,439 A | 4/1989 | Rieck | | |
| 5,328,972 A * | 7/1994 | Dada | .......... | C08F 2/06 526/227 |
| 5,490,866 A | 2/1996 | Guth | | |
| 5,627,151 A | 5/1997 | Detering et al. | | |
| 5,846,924 A | 12/1998 | Detering et al. | | |
| 6,489,422 B2 * | 12/2002 | Meffert | ..... | A61K 8/60 524/27 |
| 6,903,064 B1 * | 6/2005 | Kasturi | ............... | A11D 3/0026 424/70.11 |
| 7,439,217 B2 * | 10/2008 | Boutique | ............. | C11D 3/0015 510/276 |
| 7,709,436 B2 * | 5/2010 | Theiler | ............... | C11D 10/042 510/101 |
| 8,450,262 B2 * | 5/2013 | Dupont | ................. | C08F 220/10 510/276 |
| 2002/0011584 A1 * | 1/2002 | Uchiyama | ............... | C11D 1/62 252/8.91 |
| 2002/0177542 A1 | 11/2002 | Srinivas et al. | | |
| 2003/0062507 A1 * | 4/2003 | Radomyselski | ....... | C11D 3/162 252/8.91 |
| 2003/0216281 A1 * | 11/2003 | DeLeo | ................. | C11D 3/3773 510/475 |
| 2004/0058847 A1 * | 3/2004 | Morschhauser | ....... | C11D 3/378 510/475 |
| 2005/0026802 A1 * | 2/2005 | Kilkenny | ............... | C11D 3/044 510/295 |
| 2006/0052269 A1 | 3/2006 | Panandiker et al. | | |
| 2007/0191253 A1 * | 8/2007 | Kilkenny | ............... | A01N 37/36 510/424 |
| 2008/0242584 A1 | 10/2008 | Wahl et al. | | |
| 2009/0165228 A1 * | 7/2009 | Kilkenny | ............... | A01N 37/36 15/104.94 |
| 2010/0035789 A1 * | 2/2010 | Caswell | .................... | A47F 1/08 510/296 |
| 2011/0009309 A1 * | 1/2011 | Mertens | ............... | C11D 3/3776 510/400 |
| 2011/0257015 A1 * | 10/2011 | Bergeron | ............... | A61K 8/416 504/361 |

(Continued)

FOREIGN PATENT DOCUMENTS

| | | |
|---|---|---|
| EP | 0181204 A2 | 5/1986 |
| EP | 0181205 A2 | 5/1986 |

(Continued)

OTHER PUBLICATIONS

PCT International Search Report (PCT/EP2013/076018) dated Feb. 24, 2014.

*Primary Examiner* — Gregory R Delcotto

(74) *Attorney, Agent, or Firm* — Thomas G. Krivulka

(57) ABSTRACT

The aim of the invention is to improve the primary detergency of detergents and cleaning agents, in particular with respect to soils containing oil and/or grease. This is substantially achieved by the incorporation of polymers which can be obtained by the copolymerization of N-vinylpyrrolidone with ethylenically unsaturated compounds that have an amide function, said polymers having an aggregation parameter $X_{ag}$, where $X_{ag} > 1$ mN/m.

6 Claims, No Drawings

(56) References Cited

U.S. PATENT DOCUMENTS

2012/0225025 A1* 9/2012 Lang .................... C11D 3/0021
424/70.15
2013/0108959 A1* 5/2013 Bauer ...................... C09K 5/10
430/270.1

FOREIGN PATENT DOCUMENTS

| GB | 1464427 | 2/1977 |
|----|---------|--------|
| GB | 1473201 | 5/1977 |
| GB | 1473202 | 5/1977 |
| GB | 1473571 | 5/1977 |
| WO | 97/29139 A1 | 8/1997 |
| WO | 03/039499 A1 | 5/2003 |
| WO | 2004/014326 A1 | 2/2004 |
| WO | 2011/001173 A1 | 1/2011 |

\* cited by examiner

POLYMER ACTIVE INGREDIENTS WHICH IMPROVE PRIMARY DETERGENT POWER

FIELD OF THE INVENTION

The present invention generally relates to the use of certain polymers for improving the primary detergency of detergents or cleaning agents, in particular against bleach- or enzyme-sensitive soils, during washing of textiles or cleaning of hard surfaces, and detergents and cleaning agents which contain polymers of this type.

BACKGROUND OF THE INVENTION

In addition to the ingredients that are indispensable for the washing process, such as surfactants and builder materials, detergents generally contain further components which may be combined under the term "washing aids" and which include such different active ingredient groups as foam regulators, anti-redeposition agents, bleaching agents, bleach activators, and dye transfer inhibitors. These types of aids also include substances whose presence enhances the detergency of surfactants, without the nReed in general for these substances themselves to have pronounced surfactant behavior. This similarly also applies to cleaning agents for hard surfaces. Such substances are often referred to as detergency enhancers.

The use of poly-(N-vinylpyrrolidone) in detergents is known. For example, International Patent application WO 2011/001173 A1 describes liquid detergents which contain 0.01 to 5% by weight cellulase and 0.01 to 5% by weight poly-(N-vinylpyrrolidone) and/or the salt thereof, and have an average molecular weight of 20,000 g/mol to 60,000 g/mol.

Crosslinked polymers composed of 10 to 50% by weight N-vinyl caprolactam and 50 to 90% by weight N-vinylpyrrolidone are known from International Patent application WO 97/29139 A1, which may be prepared in the presence of 0.5 to 7% by weight of a crosslinker, which may also be 1-vinyl-3(E)-ethylidene pyrrolidone produced in situ. Such crosslinked polymers as described therein are suitable for filtering polyphenols from beer.

The soil release effect of N-vinyl caprolactam homopolymers and copolymers having small quantities of other monomers, for example N-vinylpyrrolidone, is known from European Patent application EP 0 181 204 A2. It is known from European Patent application EP 0 181 205 A2 that such polymers may also be applied as coating materials to fibers, in particular made of polyester, to achieve the soil release effect.

Detergents are known from US Patent application US 2002/0177542 which contain a quantity of N-vinyl caprolactam homopolymer having a soil release and fabric-softening effect, and a K value of at least 40.

International Patent application WO 2004/014326 A1 describes anionic surfactant-containing shampoos which contain silicone derivatives having amino and hydroxy groups, and which contain water-soluble cationic polymers having an average molecular weight of 100,000 g/mol to 2,000,000 g/mol and charge densities of 0.6 to 4 meq/g, wherein N-vinylpyrrolidone/alkylamino acrylate/N-vinyl caprolactam copolymers, among others, are named; and which are used therein due to their conditioning effect.

It has surprisingly been found that certain copolymers of N-vinylpyrrolidone which increase the surface tension of aqueous anionic surfactant solutions have particularly good properties which enhance the primary detergency.

Furthermore, other desirable features and characteristics of the present invention will become apparent from the subsequent detailed description of the invention and the appended claims, taken in conjunction with the accompanying drawings and this background of the invention.

BRIEF SUMMARY OF THE INVENTION

Use of polymers which are obtainable by copolymerization of N-vinylpyrrolidone with ethylenically unsaturated compounds having an amide function, and which have an aggregation parameter $X_{ag}$, in which $X_{ag} > 1$ mN/m, for improving the primary detergency of detergents or cleaning agents against soils during washing of textiles or cleaning of hard surfaces.

Method for removing in particular bleach- or enzyme-sensitive soils from textiles or hard surfaces, in which a detergent or cleaning agent and a polymer which is obtainable by copolymerization of N-vinylpyrrolidone with ethylenically unsaturated compounds having an amide function, and which has an aggregation parameter $X_{ag}$, in which $X_{ag} > 1$ mN/m, are used.

Detergent or cleaning agent containing a polymer which is obtainable by copolymerization of N-vinylpyrrolidone with ethylenically unsaturated compounds having an amide function, and which has an aggregation parameter $X_{ag}$, in which $X_{ag} > 1$ mN/m.

DETAILED DESCRIPTION OF THE INVENTION

The following detailed description of the invention is merely exemplary in nature and is not intended to limit the invention or the application and uses of the invention. Furthermore, there is no intention to be bound by any theory presented in the preceding background of the invention or the following detailed description of the invention.

The subject matter of the invention relates to the use of polymers which are obtainable by copolymerization of N-vinylpyrrolidone with ethylenically unsaturated compounds having an amide function, and which have an aggregation parameter $X_{ag}$, described in greater detail below, in which $X_{ag} > 1$ mN/m, preferably $> 2.5$ mN/m, and in particular is in the range of 3 mN/m to 5 mN/m, for improving the primary detergency of detergents or cleaning agents, in particular against bleach- or enzyme-sensitive soils, during washing of textiles or cleaning of hard surfaces.

The polymeric active ingredient is selected from the polymers which are obtainable by radical copolymerization of the first monomer N-vinylpyrrolidone with a second monomer, which is singly or multiply ethylenically unsaturated and bears an amide function. The aforementioned second monomer is preferably selected from the group comprising acrylamide, methacrylamide, N-alkyl acrylamide, N-alkyl methacrylamide, N,N-dialkylacrylamide, and N,N-dialkylmethacrylamide, in which the alkyl groups contain 1 to 10 C atoms, in particular 1 to 4 C atoms, and mixtures of at least two of these compounds. N,N-Dimethylacrylamide is particularly preferred.

The polymers or copolymers to be used according to the invention may optionally be present in crosslinked form in the polymerization, for example due to the presence of a doubly or multiply, in particular doubly, ethylenically unsaturated monomer. Suitable doubly or multiply ethylenically unsaturated monomers (crosslinking monomers) include in particular compounds of general formulas (I), (II), (III), (IV), or (V),

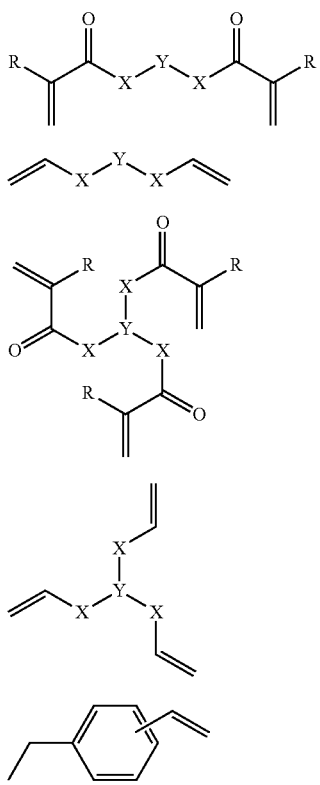

in which R stands for H or a $C_{1-6}$ alkyl radical, in particular a methyl radical, X stands for O or NH, Y stands for cyclohexyl, phenyl, $-(CR^1R^2)_n-$ or $-(CR^1R^2-O)_n-CR^1R^2-$, $R^1$ and $R^2$ independently stand for H or a $C_{1-6}$ alkyl radical, in particular a methyl radical, and n stands for a number from 1 to 30, in particular 1 to 3, and mixtures thereof. Ethylene glycol dimethacrylate is particularly preferred. The molar ratio of the singly ethylenically unsaturated monomer or the sum of singly ethylenically unsaturated monomers to the crosslinking monomer is preferably in the range of 100:1 to 20:1, in particular 70:1 to 30:1.

The polymers used according to the invention preferably contain N-vinylpyrrolidone and the ethylenically unsaturated monomer having an amide function in a weight ratio in the range of 99:1 to 50:50, in particular 98:2 to 55:45, and particularly preferably 95:5 to 80:20. In preferred embodiments of the individual aspects of the invention, this is a polymer in which the content of the vinylpyrrolidone monomer is 50% by weight to 99% by weight, in particular 80% by weight to 99% by weight, and/or the content of the ethylenically unsaturated monomer having an amide function is 1% by weight to 50% by weight, in particular 1% by weight to 20% by weight.

The polymeric active ingredient preferably has an average molecular weight in the range of 1000 g/mol to 500,000 g/mol, in particular 1100 g/mol to 150,000 g/mol (statements here and below concerning molecular weight refer to number average molecular weight).

The polymer exhibits interactions with anionic surfactants such as linear alkylbenzene sulfonate in particular; these interactions may be attributed to the formation of a surfactant-polymer aggregate. The effect can be demonstrated by measuring the surface tension or interfacial tension, wherein the surface tension or interfacial tension is increased by the presence of the polymer. This increase may be due to the fact that an aggregate having cleaning activity forms in the solution, and therefore less surfactant is present at the interface.

For determining the aggregation parameter $X_{ag}$, the surface tension $\gamma$ of an aqueous solution of 0.12 g/L linear $C_{10-13}$ alkyl benzene sulfonate, available under the trade names Disponil® LDBS 55 or Marlon® A360, for example, is measured in the absence and in the presence of 0.2 g/L of the polymer, and the value in the absence of the polymer is subtracted from the value in the presence of the polymer:

$$X_{ag}=\gamma_1(\text{surfactant+polymer})-\gamma_2(\text{surfactant}).$$

The measurement of the surface tension may be carried out by means of the Du-Noüy ring method, for example using a TE3 ring/plate tensiometer from Lauda (Lauda-Königshofen). For this purpose, a ring made of metal, for example, which is fastened to a torsional force measuring device is immersed in the surfactant-polymer solution in such a way that the ring is situated beneath the surface of the solution. The ring is then slowly pulled from the solution, and the force exerted on the measuring ring just before the liquid film tears is measured with the torsional force measuring device. The surface tension can be calculated with knowledge of the diameter of the ring and the tear-off force.

The measurements are carried out in each case at 25° C., with the measuring solutions adjusted to pH 8.5. If the polymer interacts with the surfactant, aggregation parameters $X_{ag}>1$ mN/m, preferably $X_{ag}>2.5$ mN/m, and in particular in the range of 3 mN/m to 5 mN/m, occur.

A further subject matter of the invention relates to a method for removing in particular bleach- or enzyme-sensitive soils from textiles or hard surfaces, in which method a detergent or cleaning agent and a stated polymeric active ingredient are used. This method may be carried out by hand or by machine, using a household washing machine or dishwasher, for example. It is possible for in particular liquid agents and the active ingredient to be used at the same time or one after the other. The simultaneous use may be carried out particularly advantageously by employing an agent which contains the active ingredient. Bleach- or enzyme-sensitive soils are understood to mean those which are customarily removable, at least partially, by bleaching agents or with the aid of enzymes.

The active ingredients used according to the invention are easily producible by radical polymerization of the ethylenically unsaturated monomers. The polymerization can be carried out as static or block copolymerization.

Use of the active ingredients used according to the invention results in significantly better removal of in particular bleach- or enzyme-sensitive soils on hard surfaces and on textiles, also textiles made of cotton or partially of cotton, as is the case for use of compounds known heretofore for this purpose. Alternatively, at the same soil-removing power, significant quantities of surfactants may be saved.

Within the scope of a washing or cleaning process, the use according to the invention may take place in such a way that the active ingredient is added to a solution containing a detergent or cleaning agent, or preferably, the active ingredient is introduced into the solution as a component of a detergent or cleaning agent, the concentration of the active ingredient in the solution preferably being in the range of 0.01 g/L to 0.5 g/L, in particular 0.02 g/L to 0.2 g/L.

A further subject matter of the invention therefore relates to a detergent or cleaning agent which contains a polymer which is obtainable by copolymerization of N-vinylpyrrolidone with ethylenically unsaturated compounds having an amide function, and which in particular has an aggregation parameter $X_{ag}$, in which $X_{ag} > 1$ mN/m, preferably $>2.5$ mN/m, and in particular is in the range of 3 mN/m to 5 mN/m.

Detergents or cleaning agents which contain an active ingredient to be used according to the invention or which are used together with same or used in the method according to the invention may contain all other customary components of such agents which do not interact adversely with the active ingredient essential to the invention. An active ingredient as defined above is preferably incorporated into detergents or cleaning agents in quantities of 0.1% by weight to 10% by weight, in particular 0.5% by weight to 2% by weight.

It has surprisingly been found that these types of active ingredients positively influence the effect of certain other detergent and cleaning agent ingredients, and that conversely, the effect of the active ingredient is even further intensified by certain other ingredients. These effects appear in particular in bleaching agents, in enzymatic active ingredients, in particular proteases and lipases, in water-soluble inorganic and/or organic builders, in particular based on oxidized carbohydrates or polymeric polycarboxylates, and in synthetic anionic surfactants of the sulfate and sulfonate type, for which reason the use of at least one of the named further ingredients, together with the active ingredient to be used according to the invention is preferred.

An agent which contains an active ingredient to be used according to the invention or which is used together with same or used in the method according to the invention may preferably contain peroxygen-based bleaching agents, in particular in quantities in the range of 5% by weight to 70% by weight, and optionally bleach activator, in particular in quantities in the range of 2% by weight to 10% by weight. Suitable bleaching agents are preferably the peroxygen compounds generally used in detergents, for example percarboxylic acids such as perdodecanoic acid or phthaloylamino peroxycaproic acid, and hydrogen peroxide, alkali perborate, which may be present as the tetra- or monohydrate, percarbonate, and perpyrophosphate and persilicate, which are generally present as alkali salts, in particular as sodium salts. In detergents which contain an active ingredient used according to the invention, these types of bleaching agents are preferably present in quantities of up to 25% by weight, in particular up to 15% by weight, and particularly preferably 5% by weight to 15% by weight, in each case based on the overall agent, in particular percarbonate being used. The optionally present component of the bleach activators includes the customarily used N- or O-acyl compounds, for example multiply acylated alkylenediamines, in particular tetraacetylethylenediamine, acylated glycolurils, in particular tetraacetylglycoluril, N-acylated hydantoins, hydrazides, triazoles, urazoles, diketopiperazines, sulfuryl amides, and cyanurates, in addition to carboxylic acid anhydrides, in particular phthalic anhydride, carboxylic acid esters, in particular sodium isononanoyl phenol sulfonate, and acylated sugar derivatives, in particular pentaacetyl glucose, as well as cationic nitrile derivatives such as trimethylammonium acetonitrile salts. To avoid interaction with the per compounds during storage, the bleach activators may have been coated with wrapping substances and/or granulated in a known manner, wherein tetraacetylethylenediamine, granulated with the aid of carboxymethylcellulose and having average grain sizes of 0.01 mm to 0.8 mm, granulated 1,5-diacetyl-2,4-dioxohexahydro-1,3,5-triazine, and/or trialkylammonium acetonitrile prepared in particle form are particularly preferred. These types of bleach activators are preferably contained in detergents in quantities of up to 8% by weight, in particular 2% by weight to 6% by weight, in each case based on the overall agent.

In one preferred embodiment, an agent according to the invention or an agent which is used within the scope of the use according to the invention contains synthetic anionic surfactant of the sulfate and/or sulfonate type, in particular alkylbenzene sulfonate, fatty alkyl sulfate, fatty alkyl ether sulfate, alkyl and/or dialkyl sulfosuccinate, sulfo fatty acid esters, and/or sulfo fatty diacid salts, in particular in a quantity in the range of 2% by weight to 25% by weight. The anionic surfactant is preferably selected from alkylbenzene sulfonates, alkyl or alkenyl sulfates, and/or alkyl or alkenyl ether sulfates in which the alkyl or alkenyl group contains 8 to 22, in particular 12 to 18, C atoms. These are customarily not individual substances, but, rather, cuts or mixtures. Among these, substances are preferred whose content of compounds having longer-chain radicals in the range of 16 to 18 C atoms is greater than 20% by weight.

A further embodiment of these types of agents includes the presence of nonionic surfactant, selected from fatty alkyl polyglycosides, fatty alkyl polyalkoxylates, in particular fatty alkyl ethoxylates and/or propoxylates, fatty acid polyhydroxyamides, and/or ethoxylation and/or propoxylation products of fatty alkylamines, vicinal diols, fatty acid alkyl esters, and/or fatty acid amides and mixtures thereof, in particular in a quantity in the range of 2% by weight to 25% by weight.

Suitable nonionic surfactants include the alkoxylates, in particular the ethoxylates and/or propoxylates, of saturated or singly to multiply unsaturated linear or branched-chain alcohols containing 10 to 22 C atoms, preferably 12 to 18 C atoms. The alkoxylation number of the alcohols is generally between 1 and 20, preferably between 3 and 10. The alkoxylates may be produced in a known manner by reacting the corresponding alcohols with the appropriate alkylene oxides. The derivatives of the fatty alcohols are particularly suitable, although their branched-chain isomers, in particular so-called oxo alcohols, may also be used for producing usable alkoxylates. Accordingly, the alkoxylates, in particular the ethoxylates, of primary alcohols having linear, in particular dodecyl, tetradecyl, hexadecyl, or octadecyl, radicals and mixtures thereof are usable. Appropriate alkoxylation products of alkylamines, vicinal diols, and carboxylic acid amides which correspond to the named alcohols with regard to the alkyl portion are also usable. Furthermore, the ethylene oxide and/or propylene oxide insertion products of fatty acid alkyl esters, and also fatty acid polyhydroxyamides are suitable. So-called alkyl polyglycosides which are suitable for incorporation into the agents according to the invention are compounds of the general formula $(G)_n$-$OR^{12}$, in which $R^{12}$ means an alkyl or alkenyl radical containing 8 to 22 C atoms, G means a glycose unit, and n means a number between 1 and 10. The glycoside component $(G)_n$ is oligomers or polymers of naturally occurring aldose or ketose monomers, which include in particular glucose, mannose, fructose, galactose, talose, gulose, altrose, allose, idose, ribose, arabinose, xylose, and lyxose. The oligomers made up of such glycosidically linked monomers are characterized not only by the type but also by the number of sugars which they contain, the so-called degree of oligomerization. The degree of oligomerization n generally assumes fractional numbers as values to be analytically determined, and has values between 1 and 10, and for the preferably used glycosides, a value less than 1.5, in particular between 1.2 and 1.4. Glucose is a preferred monomer structural unit since it is readily available. The alkyl or alkenyl portion $R^{12}$ of the glycosides preferably likewise comes from readily available derivatives of renewable raw materials, in particular from fatty alcohols, although their branched-chain isomers, in particular so-called oxo alcohols, may also be used for producing usable glycosides. In particular the primary alcohols having linear octyl, decyl, dodecyl, tetradecyl, hexadecyl, or octadecyl radicals and mixtures thereof are therefore usable. Particularly preferred alkyl glycosides contain a coconut fatty alkyl radical, i.e., mixtures of essentially $R^{12}$=dodecyl and $R^{12}$=tetradecyl.

In agents which contain an active ingredient that is used according to the invention or which are employed within the scope of the use according to the invention, nonionic surfactant is preferably contained in quantities of 1% by weight to 30% by weight, in particular 1% by weight to 25% by weight, wherein quantities in the upper part of this range are rather found in liquid detergents, and particle-form detergents preferably contain smaller quantities of up to 5% by weight.

The agents may alternatively or additionally contain further surfactants, preferably synthetic anionic surfactants of the sulfate or sulfonate type, which include, for example, the above-mentioned alkylbenzene sulfonates, in quantities of preferably not greater than 20% by weight, in particular 0.1% by weight to 18% by weight, in each case based on the overall agent. Synthetic anionic surfactants which are particularly suitable for use in these types of agents are the alkyl and/or alkenyl sulfates containing 8 to 22 C atoms, which bear an alkali-, ammonium-, or alkyl- or hydroxyalkyl-substituted ammonium ion as counterion. The derivatives of the fatty alcohols containing in particular 12 to 18 C atoms and their branched-chain analogs, the so-called oxo alcohols, are preferred. The alkyl and alkenyl sulfates may be prepared in a known manner by reacting the corresponding alcohol component with a customary sulfating reagent, in particular sulfur trioxide or chlorosulfonic acid, and subsequent neutralization with alkali-, ammonium-, or alkyl- or hydroxyalkyl-substituted ammonium bases. Surfactants of the sulfate type which are usable also include the sulfated alkoxylation products of the named alcohols, so-called ether sulfates. Such ether sulfates preferably contain 2 to 30, in particular 4 to 10, ethylene glycol groups per molecule. Suitable anionic surfactants of the sulfonate type include α-sulfo esters which are obtainable by reaction of fatty acid esters with sulfur trioxide and subsequent neutralization, in particular the sulfonation products derived from fatty acids containing 8 to 22 C atoms, preferably 12 to 18 C atoms, and linear alcohols containing 1 to 6 C atoms, preferably 1 to 4 C atoms, and the sulfo fatty acids which result from same by formal saponification. Preferred anionic surfactants also include the salts of sulfosuccinic acid esters, also referred to as alkylsulfosuccinates or dialkylsulfosuccinates, and the monoesters or diesters of sulfosuccinic acid with alcohols, preferably fatty alcohols and in particular ethoxylated fatty alcohols. Preferred sulfosuccinates contain $C_8$ to $C_{18}$ fatty alcohol radicals or mixtures thereof. Particularly preferred sulfosuccinates contain an ethoxylated fatty alcohol radical, which in itself represents a nonionic surfactant. Sulfosuccinates whose fatty alcohol radicals are derived from ethoxylated fatty alcohols with a narrow homolog distribution are once again particularly preferred.

Soaps are further optional surfactant ingredients that are suitable, wherein saturated fatty acid soaps such as the salts of lauric acid, myristic acid, palmitic acid, or stearic acid, and soaps derived from natural fatty acid mixtures, for example coconut, palm kernel, or tallow fat acids, are suitable. Particularly preferred are soap mixtures composed of 50% by weight to 100% by weight of saturated $C_{12}$-$C_{18}$ fatty acid soaps and up to 50% by weight of oleic acid soap. Soap is preferably contained in quantities of 0.1% by weight to 5% by weight. However, even higher soap quantities of generally up to 20% by weight may be contained, in particular in liquid agents which contain an active ingredient used according to the invention.

The agents may also contain betaines and/or cationic surfactants, if desired, which—if present—are preferably used in quantities of 0.5% by weight to 7% by weight.

In a further embodiment, the agent contains water-soluble and/or water-insoluble builders, in particular selected from alkali aluminosilicate, crystalline alkali silicate having a modulus greater than 1, monomeric polycarboxylate, polymeric polycarboxylate and mixtures thereof, in particular in quantities in the range of 2.5% by weight to 60% by weight.

The agent preferably contains 20% by weight to 55% by weight of a water-soluble and/or water-insoluble, organic and/or inorganic builder. The water-soluble organic builder substances include in particular those from the class of polycarboxylic acids, in particular citric acid and sugar acids, and the polymeric (poly-)carboxylic acids, in particular the polycarboxylates obtainable by oxidation of polysaccharides, and polymeric acrylic acids, methacrylic acids, maleic acids, and mixed polymers thereof, which may also contain small quantities of polymerizable substances without carboxylic acid functionality which are polymerized in. The relative molecular mass of the homopolymers of unsaturated carboxylic acids is generally between 5000 g/mol and 200,000 g/mol, and that of the copolymers is between 2000 g/mol and 200,000 g/mol, preferably 50,000 g/mol to 120,000 g/mol, based on the free acid. A particularly preferred acrylic acid-maleic acid copolymer has a relative molecular mass of 50,000 g/mol to 100,000 g/mol. Suitable compounds of this class, although less preferred, are copolymers of acrylic acid or methacrylic acid with vinyl ethers such as vinyl methyl ethers, and vinyl esters, ethylene, propylene, and styrene, in which the acid content is at least 50% by weight. Terpolymers containing two carboxylic acids and/or salts thereof as monomers, and containing vinyl alcohol and/or a vinyl alcohol derivative or a carbohydrate as third monomer, may also be used as water-soluble organic builder substances. The first acid monomer or salt thereof is derived from a monoethylenically unsaturated $C_3$-$C_8$ carboxylic acid, and preferably from a $C_3$-$C_4$ monocarboxylic acid, in particular from (meth-)acrylic acid. The second acid monomer or salt thereof may be a derivative of a $C_4$-$C_8$ dicarboxylic acid, maleic acid being particularly preferred. The third monomer unit in this case is formed by vinyl alcohol and/or preferably an esterified vinyl alcohol. In particular, vinyl alcohol derivatives which represent an ester of short-chain carboxylic acids, for example $C_1$-$C_4$ carboxylic acids, with vinyl alcohol are preferred. Preferred terpolymers contain 60% by weight to 95% by weight, in particular 70% by weight to 90% by weight, of (meth)acrylic acid and/or (meth)acrylate, particularly preferably acrylic acid and/or acrylate, and maleic acid and/or maleate, and 5% by weight to 40% by weight, preferably 10% by weight to 30% by weight, of vinyl alcohol and/or vinyl acetate. Terpolymers in which the weight ratio of (meth)acrylic acid and/or (meth) acrylate to maleic acid and/or maleate is between 1:1 and 4:1, preferably between 2:1 and 3:1, and in particular between 2:1 and 2.5:1, are very particularly preferred. In this regard, the quantities as well as the weight ratios are based on the acids. The second acid monomer or salt thereof may also be a derivative of an allylsulfonic acid that is substituted in the 2-position with an alkyl radical, preferably a $C_1$-$C_4$ alkyl radical, or an aromatic radical which is preferably derived from benzene or benzene derivatives. Preferred terpolymers contain 40% by weight to 60% by weight, in particular 45% by weight to 55% by weight, of (meth)acrylic acid and/or (meth)acrylate, particularly preferably acrylic acid and/or acrylate, 10% by weight to 30% by weight, preferably 15% by weight to 25% by weight, of methallylsulfonic acid and/or methallyl sulfonate, and 15% by weight to 40% by weight, preferably 20% by weight to 40% by weight, of a carbohydrate as third monomer. This carbohydrate may be a mono-, di-, oligo-, or polysaccharide, for example, with mono-, di-, or oligosaccharides being preferred and sucrose being particularly preferred. Due to the use of the third monomer, predetermined breaking points which are responsible for the good biodegradability of the polymer are presumably incorporated into the polymer. These terpolymers generally have a relative molecular mass between 1000 g/mol and 200,000 g/mol, preferably between 2000 g/mol and 50,000 g/mol, and in particular between 3000 g/mol and 10,000 g/mol. The terpolymers may be used in particular for producing liquid agents in the form of aqueous solutions, preferably in the form of 30 to 50% by weight aqueous solutions. All of the named polycarboxylic acids are generally used in the form of their water-soluble salts, in particular their alkali salts.

These types of organic builder substances are preferably contained in quantities of up to 40% by weight, in particular up to 25% by weight, and particularly preferably 1% by weight to 5% by weight. Quantities close to the stated upper limit are preferably used in agents in paste or liquid form, in particular in agents containing water.

As water-insoluble, water-dispersible inorganic builder materials, in particular crystalline or amorphous alkali aluminosilicates are used in quantities of up to 50% by weight, preferably not greater than 40% by weight, and in liquid agents in particular in quantities of 1% by weight to 5% by weight. Among these, the crystalline aluminosilicates in detergent quality, in particular zeolite NaA and optionally NaX, are preferred. Quantities close to the stated upper limit are preferably used in solid particle-form agents. Suitable aluminosilicates in particular have no particles with a grain size greater than 30 µm, and are preferably composed of at least 80% by weight of particles having a size less than 10 µm. The calcium binding capacity of the aluminosilicates, which may be determined according to the information in German Patent document DE 24 12 837, is in the range of 100 to 200 mg CaO per gram. Suitable substitutes or partial substitutes for the named aluminosilicate are crystalline alkali silicates, which may be present alone or in a mixture with amorphous silicates. The alkali silicates which are usable in the agents as builders preferably have a molar ratio of alkali oxide to $SiO_2$ of less than 0.95, in particular 1:1.1 to 1:12, and may be present in amorphous or crystalline form. Preferred alkali silicates are sodium silicates, in particular amorphous sodium silicates, having a $Na_2O:SiO_2$ molar ratio of 1:2 to 1:2.8. Such amorphous alkali silicates are commercially available under the name Portil®, for example. Within the scope of the production, amorphous alkali silicates having a $Na_2O:SiO_2$ molar ratio of 1:1.9 to 1:2.8 are preferably added as a solid, and not in the form of a solution. Crystalline layered silicates of the general formula $Na_2Si_xO_{2x+1} \cdot yH_2O$, in which x, the so-called modulus, is a number from 1.9 to 4, and y is a number from 0 to 20, and preferred values of x are 2, 3, or 4, are preferably used as crystalline silicates, which may be present alone or in a mixture with amorphous silicates. Crystalline layered silicates which are included in this general formula are described in European Patent application EP 0 164 514, for example. Preferred crystalline layered silicates are those in which in the stated general formula, x assumes the value 2 or 3. In particular, β- as well as δ-sodium disilicates $(Na_2Si_2O_5 \cdot yH_2O)$ are preferred. Crystalline alkali silicates of the above-mentioned general formula, in which x means a number from 1.9 to 2.1, which are produced from amorphous alkali silicates and are practically water-free, may also be used in agents which contain an active ingredient to be used according to the invention. In another preferred embodiment of agents according to the invention, a crystalline sodium layered silicate having a modulus of 2 to 3 is used, which may be produced from sand and soda. Crystalline sodium silicates having a modulus in the range of 1.9 to 3.5 are used in another preferred embodiment of detergents which contain an active ingredient that is used according to the invention. Their content of alkali silicates is preferably 1% by weight to 50% by weight, and in particular 5% by weight to 35% by weight, based on water-free active substance. If alkali aluminosilicate, in particular zeolite, is present as additional builder substance, the content of alkali silicate is preferably 1% by weight to 15% by weight, and in particular 2% by weight to 8% by weight, based on water-free active substance. The weight ratio of aluminosilicate to silicate, in each case based on water-free active substances, is then preferably 4:1 to 10:1. In agents which contain amorphous as well as crystalline alkali silicates, the weight ratio of amorphous alkali silicate to crystalline alkali silicate is preferably 1:2 to 2:1, and in particular 1:1 to 2:1.

In addition to the named inorganic builder, further water-soluble or water-insoluble inorganic substances may be contained in the agents which contain an active ingredient that is to be used according to the invention, or which are used together with same or used in the method according to the invention. In this regard, alkali carbonates, alkali hydrogen carbonates, and alkali sulfates and mixtures thereof are suitable. Such additional inorganic material may be present in quantities of up to 70% by weight.

In addition, the agents may contain further components which are customary in detergents or cleaning agents. These optional components include in particular enzymes, enzyme stabilizers, complexing agents for heavy metals, for example aminopolycarboxylic acids, aminohydroxypolycarboxylic acids, polyphosphonic acids, and/or aminopolyphosphonic acids, and foam inhibitors, for example organopolysiloxanes or paraffins, and solvents and optical brighteners, for example stilbene disulfonic acid derivatives. Agents which contain an active ingredient used according to the invention preferably contain up to 1% by weight, in particular 0.01% by weight to 0.5% by weight, of optical brighteners, in particular compounds from the class of substituted 4,4'-bis-(2,4,6-triamino-s-triazinyl)stilbene-2,2'-disulfonic acids, up to 5% by weight, in particular 0.1% by weight to 2% by weight, of complexing agents for heavy metals, in particular aminoalkylene phosphonic acids and salts thereof, and up to 2% by weight, in particular 0.1% by weight to 1% by weight, of foam inhibitors, wherein the stated weight proportions in each case are based on the overall agent.

In addition to water, solvents which may be used in particular in liquid agents preferably include those that are miscible with water. These include the lower alcohols, for example ethanol, propanol, isopropanol, and the isomeric butanols, and glycerin, lower glycols, for example ethylene glycol and propylene glycol, and the ethers which are derivable from the named compound classes. The active ingredients used according to the invention are generally present in such liquid agents in dissolved or suspended form.

The enzymes that are preferably present are selected in particular from the group comprising protease, amylase, lipase, cellulase, hemicellulase, oxidase, peroxidase, pectinase, and mixtures thereof. Protease obtained from microorganisms such as bacteria or fungi are primarily suitable. It may be obtained from suitable microorganisms in a known manner via fermentation processes. Proteases are commercially available under the names BLAP®, Savinase®, Esperase®, Maxatase®, Optimase®, Alcalase®, Durazym®, or Maxapem®, for example. Usable lipase may be obtained, for example, from *Humicola lanuginosa*, from *Bacillus* species, from *Pseudomonas* species, from *Fusarium* species, from *Rhizopus* species, or from *Aspergillus* species. Suitable lipases are commercially available under the names Lipolase®, Lipozym®, Lipomax®, Lipex®, Amano® lipase, Toyo Jozo® lipase, Meito® lipase, and Diosynth® lipase, for example. Suitable amylases are commercially available under the names Maxamyl®, Termamyl®, Duramyl®, and Purafect® OxAm, for example. Usable cellulase may be an enzyme, obtainable from bacteria or fungi, which has a pH optimum preferably in the slightly acidic to slightly alkaline range of 6 to 9.5. These types of cellulases are commercially available under the names Celluzyme®, Carezyme®, and Ecostone®. Suitable pectinases are obtainable, for example, under the names Gamanase®, Pectinex AR®, X-Pect®, or Pectaway® from Novozymes, under the names Rohapect UF®, Rohapect TPL®, Rohapect PTE100®, Rohapect MPE®, Rohapect MA plus HC, Rohapect DA12L®, Rohapect 10L®, Rohapect B1L® from AB Enzymes, and under the name Pyrolase® from Diverse Corp., San Diego, Calif., US.

Customary enzyme stabilizers which are optionally present, in particular in liquid agents, include amino alcohols, for example mono-, di-, and triethanolamine and mono-, di-, and tripropanolamine and mixtures thereof, lower carboxylic acids, boric acid, alkali borates, boric acid-carboxylic acid combinations, boric acid esters, boronic acid derivatives, calcium salts, for example a combination of Ca and formic acid, magnesium salts, and/or sulfur-containing reducing agents.

Suitable foam inhibitors include long-chain soaps, in particular behenic soap, fatty acid amides, paraffins, waxes, microcrystalline waxes, and organopolysiloxanes and mixtures thereof, which may also contain microfine, optionally silanated or otherwise hydrophobized silicic acid. For use in particle-form agents, foam inhibitors of this type are preferably bound to granular, water-soluble carrier substances.

The known polyester-active soil-removing polymers, which may be used in addition to the active ingredients that are essential to the invention, include copolyesters from dicarboxylic acids, for example adipic acid, phthalic acid, or terephthalic acid, and diols, for example ethylene glycol or propylene glycol, and polydiols, for example polyethylene glycol or polypropylene glycol. The preferably used soil-removing polyesters include those compounds which are available by formal esterification of two monomer portions, the first monomer being a dicarboxylic acid HOOC-Ph-COOH, and the second monomer being a diol HO—$(CHR^{11}—)_n$OH, which may also be present as a polymeric diol H—$(O—(CHR^{11}—)_a)_b$OH. In the formulas, Ph means an o-, m-, or p-phenylene radical which may bear 1 to 4 substituents selected from alkyl radicals containing 1 to 22 C atoms, sulfonic acid groups, carboxyl groups, and mixtures thereof, $R^{11}$ means hydrogen, an alkyl radical containing 1 to 22 C atoms, and mixtures thereof, a means a number from 2 to 6, and b means a number from 1 to 300. The polyesters which are obtainable therefrom preferably contain monomer diol units —O—$(CHR^{11}—)_a$O— as well as polymer diol units —O—$(CHR^{11}—)_a)_b$O—. The molar ratio of monomer diol units to polymer diol units is preferably 100:1 to 1:100, in particular 10:1 to 1:10. The degree of polymerization b in the polymer diol units is preferably in the range of 4 to 200, in particular 12 to 140. The molecular weight or the average molecular weight or the maximum of the molecular weight distribution of preferred soil-removing polyesters is in the range of 250 g/mol to 100,000 g/mol, in particular 500 g/mol to 50,000 g/mol. The acid on which the Ph radical is based is preferably selected from terephthalic acid, isophthalic acid, phthalic acid, trimellitic acid, mellitic acid, the isomers of sulfophthalic acid, sulfoisophthalic acid, and sulfoterephthalic acid, and mixtures thereof. If their acid groups are not part of the ester bonds in the polymer, they are preferably present in the form of a salt, in particular an alkali or ammonium salt. Among these, the sodium and potassium salts are particularly preferred. If desired, instead of the HOOC-Ph-COOH monomer, small quantities, in particular not more than 10 mol-%, based on the content of Ph having the meaning stated above, of other acids which have at least two carboxyl groups may be contained in the soil-removing polyester. These include, for example, alkylene and alkenylene dicarboxylic acids such as malonic acid, succinic acid, fumaric acid, maleic acid, glutaric acid, adipic acid, pimelic acid, suberic acid, azelaic acid, and sebacic acid. The preferred diols HO—$(CHR^{11}—)_a$OH include those in which $R^{11}$ is hydrogen and a is a number from 2 to 6, and those in which a has the value 2 and $R^{11}$ is selected from among hydrogen and the alkyl radicals containing 1 to 10, in particular 1 to 3, C atoms. Of the latter-referenced diols, those of formula HO—$CH_2$—$CHR^{11}$—OH, in which $R^{11}$ has the meaning stated above, are particularly preferred. Examples of diol components are ethylene glycol, 1,2-propylene glycol, 1,3-propylene glycol, 1,4-butanediol, 1,5-pentanediol, 1,6-hexanediol, 1,8-octanediol, 1,2-decanediol, 1,2-dodecanediol, and neopentyl glycol. Among the polymeric diols, polyethylene glycol, having an average molar mass in the range of 1000 g/mol to 6000 g/mol, is particularly preferred.

If desired, these polyesters having a composition as described above may also be closed by end groups, wherein alkyl groups containing 1 to 22 C atoms and esters of monocarboxylic acids are suitable end groups. The end groups which are bound via ester bonds may be based on alkyl, alkenyl, and arylmonocarboxylic acids containing 5 to 32 C atoms, in particular 5 to 18 C atoms. These include valeric acid, caproic acid, enanthic acid, caprylic acid, pelargonic acid, capric acid, undecanoic acid, undecenoic acid, lauric acid, lauroleic acid, tridecanoic acid, myristic acid, myristoleic acid, pentadecanoic acid, palmitic acid, stearic acid, petroselinic acid, petroselaidic acid, oleic acid, linoleic acid, linolaidic acid, linolenic acid, eleostearic acid, arachic acid, gadoleic acid, arachidonic acid, behenic acid, erucic acid, brassidinic acid, clupanodonic acid, lignoceric acid, cerotic acid, melissic acid, and benzoic acid, which may bear 1 to 5 substituents with a total of up to 25 C atoms, in particular 1 to 12 C atoms, for example tert-butylbenzoic acid. The end groups may also be based on hydroxymonocarboxylic acids containing 5 to 22 C atoms, which include hydroxyvaleric acid, hydroxycaproic acid, ricinoleic acid and its hydrogenation product hydroxystearic acid, and o-, m-, and p-hydroxybenzoic acid. The hydroxymonocarboxylic acids themselves may be bound to one another via their hydroxyl group and their carboxyl group, and may therefore be multiply present in an end group. The number of hydroxymonocarboxylic acid units per end group, i.e., their degree of oligomerization is preferably in the range of 1 to 50, in particular 1 to 10. In one preferred embodiment of the invention, polymers of ethylene terephthalate and polyethylene oxide terephthalate, in which the polyethylene glycol units have molar weights of 750 g/mol to 5000 g/mol, and the molar ratio of ethylene terephthalate to polyethylene oxide terephthalate is 50:50 to 90:10, are used in combination with an active ingredient that is essential to the invention.

The soil-removing polymers are preferably water-soluble, wherein the term "water-soluble" is understood to mean a solubility of at least 0.01 g, preferably at least 0.1 g, of the polymer per liter water at room temperature and pH 8. However, under these conditions, polymers which are preferably used have a solubility of at least 1 g per liter, in particular at least 10 g per liter.

The production of solid agents according to the invention poses no difficulties, and may be carried out in a known manner, for example by spray drying or granulation; enzymes and other possible thermally sensitive ingredients, such as bleaching agents, are optionally added separately at a later time. For producing agents according to the invention having an increased bulk density in particular in the range of 650 g/L to 950 g/L, a method having an extrusion step is preferred.

For producing agents according to the invention in tablet form, which may be monophasic or polyphasic, one-colored or multi-colored, and which may in particular consist of one layer or multiple layers, in particular two layers, the preferred procedure is to mix all components, optionally for one layer each, in a mixer, and to press the mixture using conventional tablet presses, for example eccentric presses or rotary presses, with pressing forces in the range of approximately 50 to 100 kN, preferably 60 to 70 kN. In particular for multi-layer tablets it may be advantageous when at least one layer is prepressed. This is preferably carried out at pressing forces between 5 and 20 kN, in particular 10 to 15 kN. Tablets are thus easily obtained which are resistant to breakage but still sufficiently quick-dissolving under the usage conditions, with breaking strengths and bending strengths of normally 100 to 200 N, but preferably above 150 N. A tablet produced in this way preferably has a weight of 10 g to 50 g, in particular 15 g to 40 g. The rough shape of the tablets is arbitrary, and may be round, oval, or polygonal, wherein intermediate shapes are also possible. Corners and edges are advantageously rounded. Round tablets preferably have a diameter of 30 mm to 40 mm. In particular the size of polygonal or square tablets, which are introduced mainly via the dosing device of the dishwasher, for example, is dependent on the geometry and the volume of this dosing device. Examples of preferred embodiments have a base area of (20 to 30 mm)×(34 to 40 mm), in particular 26×36 mm or 24×38 mm.

Liquid or paste-like agents according to the invention in the form of solutions containing customary solvents, in particular water, are generally produced by simple mixing of the ingredients, which may be added to the substance or as a solution to an automatic mixer.

In one preferred embodiment, an agent into which active ingredient to be used according to the invention is incorporated is liquid, and contains 1% by weight to 15% by weight, in particular 2% by weight to 10% by weight, of nonionic surfactant, 2% by weight to 30% by weight, in particular 5% by weight to 20% by weight, of synthetic anionic surfactant, up to 15% by weight, in particular 2% by weight to 12.5% by weight, of soap, 0.5% by weight to 5% by weight, in particular 1% by weight to 4% by weight, of organic builder, in particular polycarboxylate such as citrate, up to 1.5% by weight, in particular 0.1% by weight to 1% by weight, of complexing agent for heavy metals, such as phosphonate, and water and/or water-miscible solvent in addition to optionally contained enzyme, enzyme stabilizer, dye, and/or fragrance.

In another preferred embodiment, an agent into which active ingredient to be used according to the invention is incorporated is in particle form, and contains up to 25% by weight, in particular 5% by weight to 20% by weight, of bleaching agent, in particular alkali percarbonate, up to 15% by weight, in particular 1% by weight to 10% by weight, of bleach activator, 20% by weight to 55% by weight of inorganic builder, up to 10% by weight, in particular 2% by weight to 8% by weight, of water-soluble organic builder, 10% by weight to 25% by weight of synthetic anionic surfactant, 1% by weight to 5% by weight of nonionic surfactant, and up to 25% by weight, in particular 0.1% by weight to 25% by weight, of inorganic salts, in particular alkali carbonate and/or alkali hydrogen carbonate.

EXAMPLES

Example 1

Production of poly(vinylpyrrolidone-co-N,N-dimethylacrylamide) (E1)

6.5 g N,N-dimethylacrylamide (65.6 mmol), 65.9 g N-vinylpyrrolidone (592.8 mmol), and 11.8 g azobisisobutyronitrile (AIBN) (72.1 mmol) were dissolved in 1330 mL isopropanol. The solution was deoxygenated by passing through nitrogen. The solution was subsequently stirred for 2 days at 65° C. An additional 11.8 g AIBN was then added, and the reaction mixture was degassed once more. The mixture was stirred for an additional 6 days at 65° C. The reaction was then terminated by introducing oxygen. The solvent was stripped on a rotary evaporator, the reaction product was taken up in 750 mL water, and insoluble components were removed by filtration. The copolymer was subsequently isolated by freeze drying.

Yield: 66.4 g (91.7% of theoretical)

Example 2

Determination of the Aggregation Parameter $X_{ag}$ Via the Static Surface Tension The surface tension γ of an aqueous solution of 0.2 g/L linear alkylbenzene sufonate (LAS; Disponil® LDBS 55) adjusted to pH 8.5 was measured at 25° C., using a TE3 ring/plate tensiometer from Lauda. The measurement was repeated with solutions that were identical, except that they contained an additional 0.12 g/L of the particular polymer to be tested. The aggregation parameter $X_{ag}$ was determined by subtracting the measured value of the system without polymer from the measured value of the system with polymer.

$$X_{ag} = \gamma_1(\text{surfactant+polymer}) - \gamma_2(\text{surfactant})$$

The polymer E1 produced in Example 1 was tested. The aggregation parameter given in Table 1 below was determined:

TABLE 1

| Aggregation parameter of the surfactant-polymer system | |
|---|---|
| System | $X_{ag}$ |
| LAS + E1 | 3.4 |

The measurement of the surface tension in the presence and in the absence of polymer was also carried out in a detergent frame formulation containing alkylbenzene sufonate. Here as well, the interaction of the polymer was clearly discernible. This demonstrates that the formation of the aggregate with cleaning activity is not a phenomenon that is limited to the isolated surfactant-polymer system. Rather, it is an application-relevant effect which brings about improved performance in the cleaning application.

Example 3

TABLE 3

| Detergent compositions (expressed in % by weight) | | | | | | | | |
|---|---|---|---|---|---|---|---|---|
| | A | B | C | D | E | F | G | H |
| C9-13 alkylbenzene sulfonate, Na salt | 9 | 10 | 6 | 7 | 5 | 15 | 15 | 9 |
| C12-18 fatty alcohol having 7 EO | 8 | 9 | 6 | 7 | 5 | 6 | 11 | 10 |
| C12-14 fatty alcohol sulfate having 2 EO | — | — | 8 | 7 | 10 | 2 | 2 | 5 |
| C12-18 fatty acid, Na salt | 4 | 3 | 3 | 3 | 4 | 2 | 4 | 7 |
| Citric acid | 2 | 3 | 3 | 2 | 2 | 2 | 2 | 3 |
| Sodium hydroxide, 50% | 3 | 3 | 2 | 3 | 3 | 3 | 3 | 4 |
| Boric acid | 1 | 1 | 1 | 1 | 1 | 1 | 1 | 1 |
| Enzymes (amylase, protease, cellulase) | + | + | + | + | + | + | + | + |
| Fragrance | 1 | 0.5 | 0.5 | 1 | 1 | 1 | 1 | 1 |
| Propanediol | — | — | — | — | — | 5 | 5 | — |
| Ethanol | 1.5 | 1.5 | 1.5 | 1.5 | 1.5 | 1.5 | 1.5 | 5 |
| PVA/maleic acid copolymer | 0.1 | — | 0.1 | — | — | — | — | — |
| Optical brightener | — | 0.1 | — | 0.1 | 0.2 | 0.2 | 0.2 | 0.2 |
| Opacifier | 0.2 | — | — | — | — | — | — | — |
| Phosphonic acid, Na salt | 0.5 | 0.5 | 0.5 | 0.5 | 0.5 | 0.5 | 0.5 | 0.5 |
| Polymer essential to the invention | 2 | 2 | 2 | 2 | 2 | 2 | 2 | 2 |
| Water | To make 100 | | | | | | | |

Example 4

Washing Tests

Household washing machines (Miele® W 1514) were loaded with 3.5 kg of clean accompanying laundry and with test textiles made of cotton and soil ballast, provided with standardized soils (A: chocolate milk/carbon black; B: blackberry juice; C: chocolate pudding; D: blueberry juice). 75 mL of detergent C stated in Example 3 containing the polymer E1 produced in Example 1 were dosed, and washing was carried out at 40° C. After the test textiles were hung to dry and mangled, their whiteness was determined by spectrophotometry (Minolta® CR200-1). Table 4 below shows the differences in reflectance values from detergent having an otherwise identical composition, but without the polymer essential to the invention, as average values from six determinations, and the errors in the 6-fold determination (HSD).

TABLE 4

| Washing results (expressed in % by weight) | | |
|---|---|---|
| Polymer/soil | E1 | HSD |
| A | 5.5 | 2.6 |
| B | 4.9 | 3.4 |
| C | 2.7 | 1.8 |
| D | 2.8 | 1.0 |

The detergent containing an active ingredient to be used according to the invention showed much better primary detergency than the agent having an otherwise identical composition, but lacking said active ingredient.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

What is claimed is:

1. A detergent or cleaning agent for the washing of textiles or cleaning of hard surfaces comprising crosslinked polymers obtained by polymerization of N-vinylpyrrolidone with N,N-dimethylacrylamide, and wherein the polymerization further comprises crosslinking monomer ethylene glycol dimethacrylate, wherein the molar ratio of the sum of N-vinylpyrrolidone and N,N-dimethylacrylamide to ethylene glycol dimethacrylate is from 70:1 to 30:1, and wherein the crosslinked polymers have an aggregation parameter $X_{ag}$, in which $X_{ag}$ is from 3 mN/m to 5 mN/m, wherein the agent comprises a synthetic anionic surfactant selected from the group consisting of alkyl and dialkyl sulfosuccinates and wherein the agent further comprises protease and lipase enzymes.

2. The agent according to claim 1, wherein the crosslinked polymers contain N-vinylpyrrolidone and N N-dimethylacrylamide in a weight ratio in the range of 99:1 to 50:50.

3. The agent according to claim 1, wherein the crosslinked polymers have an average molecular weight in the range of 1000 g/mol to 50,000 g/mol.

4. The agent according to claim 1, wherein the agent contains the crosslinked polymers in quantities of 0.1% by weight to 10% by weight.

5. A method for removing bleach- or enzyme-sensitive soils from textiles or hard surfaces, said method comprising contacting said soils on the textiles or hard surfaces with a detergent or cleaning agent according to claim 1.

6. A method according to claim 5, wherein said method is carried out using a household washing machine or dishwasher.

* * * * *